United States Patent

[11] 3,617,622

[72] Inventor Leopold Albert Harwood
Somerville, N.J.
[21] Appl. No. 823,066
[22] Filed May 8, 1969
[45] Patented Nov. 2, 1971
[73] Assignee RCA Corporation

[54] OSCILLATOR CIRCUITS FOR PROVIDING A VARIABLE AMPLITUDE OUTPUT SIGNAL UNDER CONTROL OF AN INJECTED INPUT SIGNAL
10 Claims, 3 Drawing Figs.

[52] U.S. Cl. .... 178/5.4 SY, 178/69.5 CB, 331/109, 331/166, 331/173
[51] Int. Cl. .... H04m 9/46
[50] Field of Search .... 178/69.5 CB, 5.4 SY, 5.4 NC; 331/116, 166, 173

[56] References Cited

UNITED STATES PATENTS

| | | | |
|---|---|---|---|
| 3,134,947 | 5/1964 | Charasz | 331/116 |
| 3,213,390 | 10/1965 | Faith et al. | 331/116 |
| 3,239,776 | 3/1966 | Shaw | 331/116 |
| 3,415,949 | 12/1968 | Williams | 178/695 CB |

*Primary Examiner*—Robert L. Griffin
*Assistant Examiner*—Donald E. Stout
*Attorney*—Eugene M. Whitacre

ABSTRACT: An oscillator circuit includes a first amplifier and a limiter amplifier coupled together through a filter network for supplying AC feedback thereto of a sufficient phase and magnitude to sustain oscillations. A reference signal, for phase-locking the signal of the oscillator, while varying the amplitude, is applied to the oscillator through the filter network. A passive network coupled to a separate terminal of the limiter-amplifier affords control of the peak amplitude of oscillations, while further providing a DC potential across the passive network representative of the average amplitude of the oscillatory signal.

INVENTOR
Leopold Albert Harwood

BY Eugene M. Whitacre
ATTORNEY

INVENTOR
Leopold Albert Harwood
BY Eugene M. Whitacre
ATTORNEY

INVENTOR
Leopold Albert Harwood
BY Eugene M. Whitacre
ATTORNEY

OSCILLATOR CIRCUITS FOR PROVIDING A VARIABLE AMPLITUDE OUTPUT SIGNAL UNDER CONTROL OF AN INJECTED INPUT SIGNAL

OSCILLATOR CIRCUITS

The invention relates, in general, to signal oscillator circuitry, and more particularly to injection-locked chroma oscillators for use in a color television receiver, and especially adaptable to integrated circuit techniques.

In a television receiver the output of a 3.58-MHz. crystal oscillator circuit is employed as a reference signal for demodulation of the chrominance subcarrier components.

Many techniques are shown in the prior art for generating such a signal, and for locking the signal to an oscillator burst transmitted with the composite signal. The burst signal is transmitted during a horizontal sychronizing interval, and represents a reference phase of the chrominance subcarrier as utilized at the transmitter.

A prime concern in the fabrication and design of such oscillators is the frequency stability of the oscillator; and in injection-locked types, the ability of the oscillator to respond to the frequency and phase of the burst signal applied thereto. Frequency stability, desirably, is determined by the crystal utilized therein, and is desirably not primarily a function of the active device (i.e., of the vacuum tubes or transistors employed), or of component values, which may vary with temperature and signal level.

The chroma oscillator circuit, as utilized in many conventional receivers, also serves to provide a source of control voltage for performing color-killing and ACC detection. As such, other specifications concerning amplitude stability, and so on, must be considered. In the integrated circuit environment one does not have the absolute control over active and passive component values as exists in the discrete component art. Integrated circuit transistors, using monolithic techniques, may exhibit beta variations in excess of 5 to 1, while the absolute value of other components, such as resistors and capacitors, may vary from a predetermined value by as much as ±25 percent. With such limitations on component values there exists further limitations concerning the integrated circuit assembly. Such limitations involve the restricted number of terminals that may be utilized on an integrated circuit substrate. Particularly, in an injection-locked oscillator, fabricated on an integrated circuit assembly, one has to usually provide input and output terminals for applying the feedback signal plus at least another terminal for application thereto of the burst signal. Associated with these considerations in the further problem of burst selectivity and oscillator selectivity. Such considerations result in inductor, capacitor resonant circuits of relatively high quality factors, which because of circuit technology, usually appear as off-board or external to the chip, components. Coupled with these problems is the further problem of deriving reliable color killer and automatic chroma control information from the integrated circuit oscillator configuration.

It is therefore an object of the present invention to provide an improved oscillator configuration employing integrated circuit techniques having few external terminals.

A further object is to provide an improved chroma oscillator circuit employing a frequency selective crystal having a stability determined substantially by the crystal and virtually independent of varying parameters associated with integrated circuit components.

Still a further object is to provide an improved injection-locked chroma oscillator furnishing information pertinent to color killing and ACC, using integrated, monolithic components.

According to an embodiment of the invention, a first amplifier has an input and output terminals, the output terminal of the amplifier being coupled to the input terminal of a limiter amplifier. The limiter amplifier has an output terminal thereof coupled to a narrow-band, filter network which has another terminal coupled to the input terminal of the first amplifier for providing AC feedback of a sufficient magnitude to sustain oscillations. A burst or reference signal is injected into the filter network of a sufficient amplitude, as finally filtered, to lock the oscillations in phase and frequency to those of the reference signal, while varying the amplitude of oscillations according to the magnitude of those frequency signals, including the reference signal and noise, which propagage through the filter network.

An independent terminal associated with the limiter amplifier includes a passive network coupled thereto, for adjusting the peak magnitude of the oscillations and further providing a DC potential representative of the average amplitude of such oscillations.

Other objects and advantages of the present invention will be readily apparent to those skilled in the art upon a reading of the following detailed description and an inspection of the accompanying drawings in which:

FIG. 1 provides a block diagram illustration of chrominance signal processing circuitry included in a color television receiver.

Figure 1:
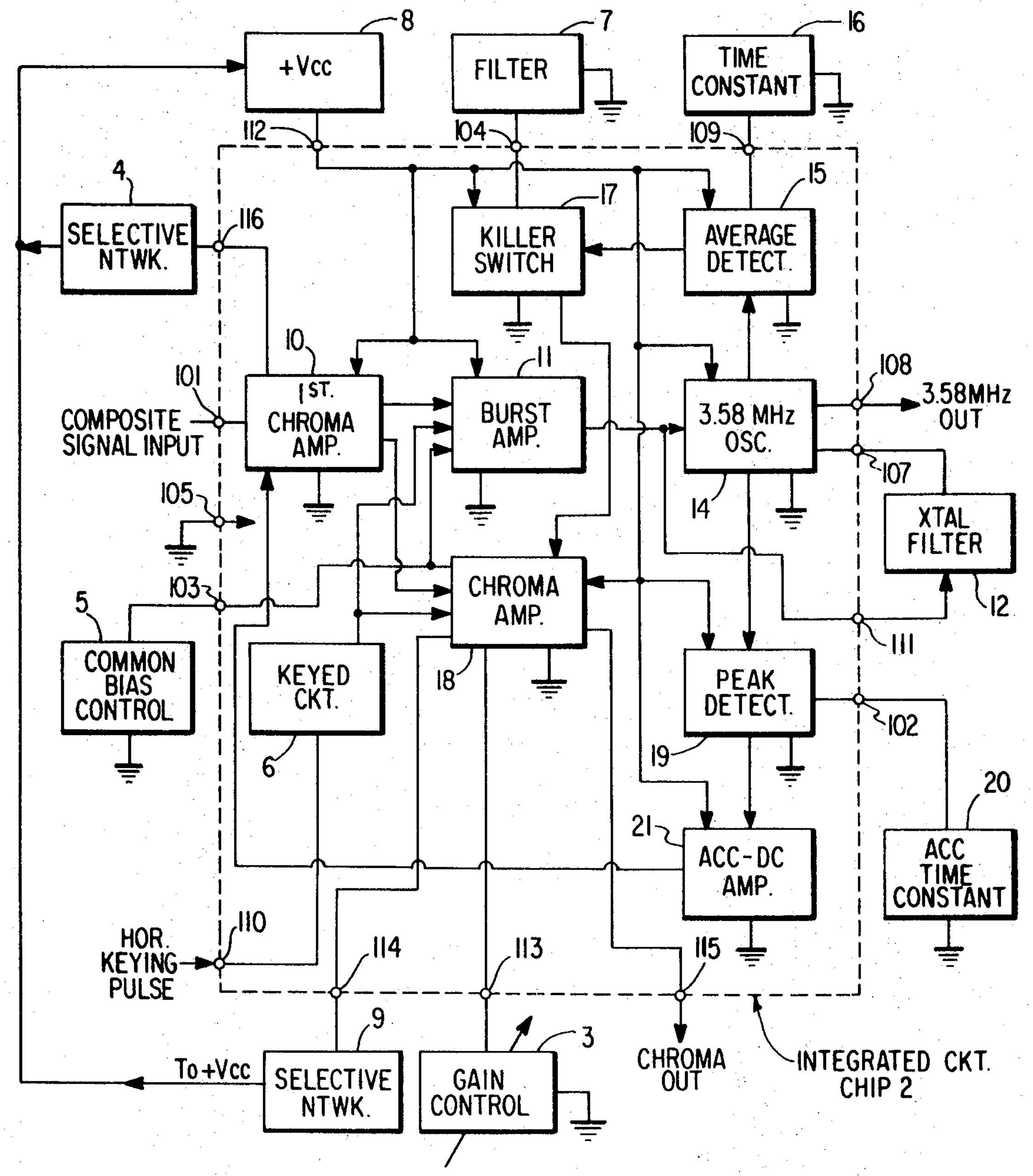

Referring to FIG. 1 there is shown chrominance processing circuitry of a color television receiver. Some functions performed in the chrominance section of many color receivers are amplification of the chroma signal, regeneration of the chrominance subcarrier, automatic control of the chrominance amplitude (ACC) and disabling of the chrominance channel during a monochrome transmission or color killing.

In FIG. 1 the chrominance-processing portion of a television receiver is illustrated in simplified block diagram form. A composite video signal is applied to an input terminal 101 of an integrated circuit chip 2. The circuitry of the chip 2 includes a first chroma amplifier 10 which responds to the signal delivered to terminal 101 and delivers an amplified version thereof at an output terminal coupled to an input of a burst amplifier 11 and a chroma amplifier 18. Selective networks 4 and 9 are externally connected to terminals 116 and 114 for providing chroma selectivity for the first chrominance amplifier 10 and chroma amplifier 18. The burst amplifier 11 is keyed during a horizontal synchronizing interval by means of a keyed circuit 6 having an input terminal 110 for application thereto of a horizontal keying pulse. The keyed circuit 6 activates the burst amplifier 11 during the horizontal retrace interval, and serves to disable the chroma amplifier 18 during the same interval. The output of the burst amplifier 11 is filtered by a narrow-band crystal filter 12 also coupled external to the integrated circuit chip 2 and located between an output terminal 111 of the burst amplifier, and an input terminal 107 associated with a chroma oscillator 14. Oscillator 14 includes the crystal filter network 12 in a feedback loop and provides a continuous wave output signal at terminal 108 which is locked in phase and frequency with the incoming burst signal, when present.

In the configuration shown, an output of the oscillator 14 is applied to an input of an average detector 15 used for color killer detection. FIG. 1 shows a separate average detector coupled to the oscillator 14, for purposes of explaining the function. As will be seen subsequently, however, average detection may be conveniently provided within the oscillator configuration. An output terminal 109 of the average detector 15 has coupled thereto, an appropriate time constant circuit 16 used for ACC and color killer threshold adjustments. An output of the average detector 15 is coupled to a killer switch circuit 17, included on the integrated circuit substrate. The killer switch circuit 17 has a terminal 104 for connection thereto of an appropriate external filter element 7 also useful for reducing chrominance subcarrier coupling. An output of the killer switch circuit 17 is applied to an input of the chroma amplifier 18 for disabling the chrominance channel during a monochrome transmission. An output from the chrominance amplifier 18 is coupled to a terminal 115 for application of chrominance signal to color demodulator stages, not shown.

A second output from the oscillator 14 is applied to a peak detector circuit 19 for providing an ACC control voltage. The control voltage is amplified by the ACC amplifier 21, and used to control the gain of chrominance amplifier 10. As is more clearly shown in my copending application entitled "Automatic Chroma Control Circuits" Ser. No. 822,951, filed on May 8, 1969 and assigned to the same assignee, the chrominance signal level output is controlled as determined by the peak amplitude detected combined output signal as both burst and noise affected. The integrated circuit chip 2 further includes a terminal 112 for the application thereto of a suitable operating potential designated as $+V_{cc}$ and obtained from a conventional source 8. A ground terminal 105 to provide a common reference potential for the integrated circuit chip 2 is also provided. The chroma-processing integrated circuit chip 2 further includes a terminal 113 coupled to a variable gain control circuit 3 for the chrominance amplifier 18.

Figure 2:
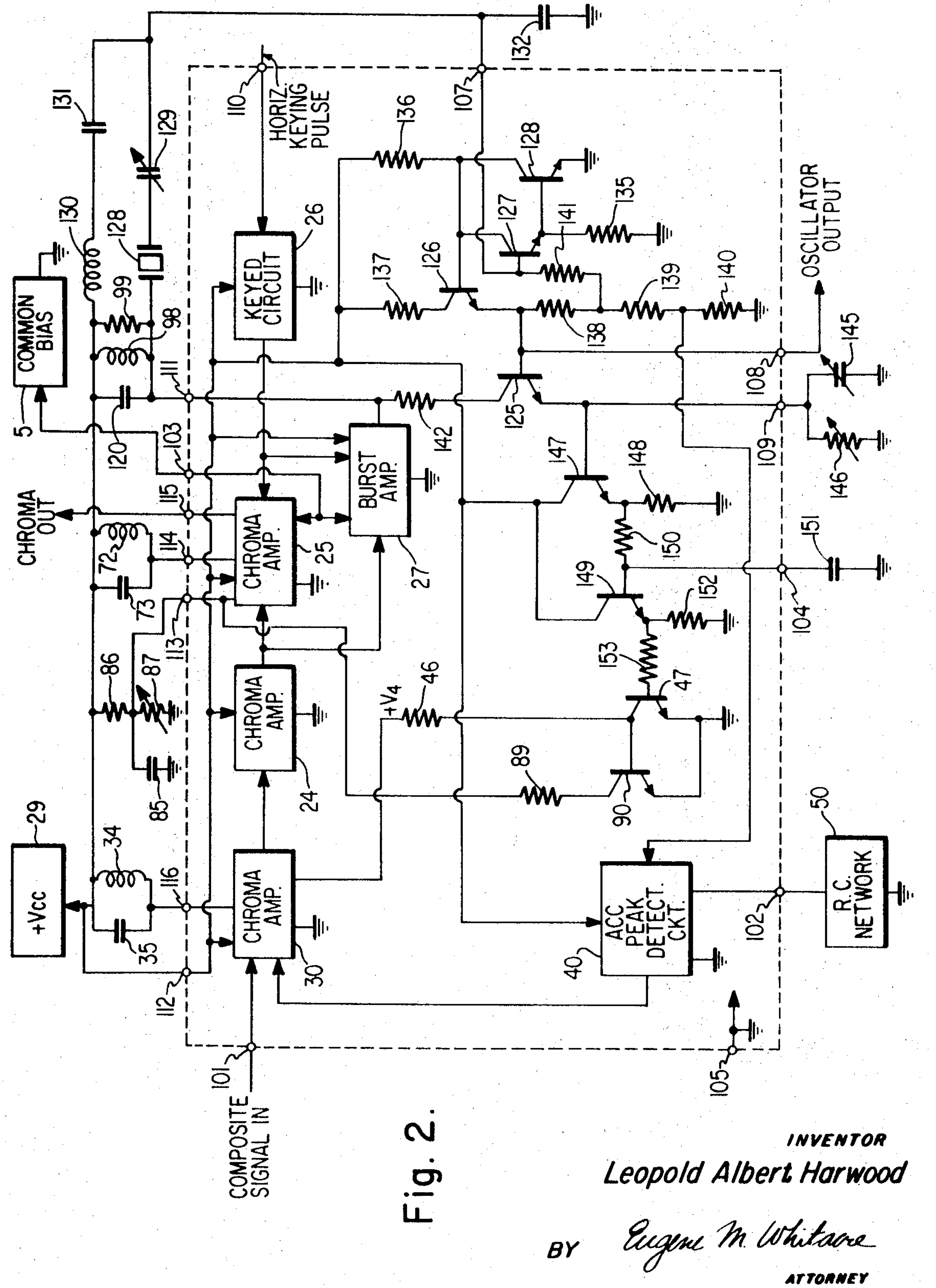
FIG. 2 is a more detailed schematic representation partially in block diagram form of the processing circuitry shown in FIG. 1, including a detailed schematic of a chroma oscillator according to the invention.

Referring to FIG. 2 there is shown a schematic diagram, partially in block form, of an integrated circuit configuration including an oscillator circuit according to this invention.

A composite television signal is applied to terminal 101 on the integrated circuit substrate which terminal is coupled to an input of a chrominance amplifier 30. A parallel resonant tank circuit, comprising inductor 34 and capacitor 35, is coupled between the substrate terminal 116 and a source of operating potential 29 designated as $+V_{cc}$. The $+V_{cc}$ source is also connected to terminal 112 for supplying operating potential to the integrated circuit devices. The parallel resonant tank has a frequency band-pass characteristic within the chrominance subcarrier frequency range and serves to provide the bandwidth selection for the composite signal as amplified and applied to the input of a second chrominance amplifier 24. The chrominance amplifier 24 has an output coupled to chrominance amplifier 25 and to a burst amplifier 27. The chrominance amplifier 25 includes a terminal 113 which is coupled to a gain control circuit utilizing a variable voltage divider comprising resistors 86 and 87. The gain control circuit is coupled between the $+V_{cc}$ supply and a point of reference potential, and furnished external to the integrated circuit substrate. A capacitor 85 serves as a bypass for the junction between resistors 86 and 87 which junction is coupled to terminal 113.

A terminal 114 is also coupled to chrominance amplifier 25 and serves to accommodate a second selective resonant circuit comprising an inductor 72 and a capacitor 73, which, in conjunction, with the aforementioned resonant circuit serves to provide the chrominance band-pass selectivity response. An output chrominance signal from amplifier 25 is available at terminal 115 for application thereto to suitable demodulator circuits not shown.

Burst separation is provided for by keying the burst separator amplifier 27 by means of a keyed circuit 26 activated by a horizontal keying pulse applied to terminal 110. The keying pulse, as processed by the keying circuit 26, is also applied to the chrominance amplifier 25 for burst elimination of the chrominance channel during burst retrieval. The burst separator amplifier 27 has a frequency selective load externally connected at terminal 111 comprising the parallel combination of inductor 98, damping resistor 99 and capacitor 120. The parallel resonant circuit, thusly formed, is coupled between the $+V_{cc}$ supply and terminal 111 and is selected to provide a fairly broad frequency response about a center frequency of approximately 3 MHz. As keyed, during the horizontal interval, the burst separator amplifier 27, provides at terminal 111, an amplified version of the oscillatory burst representative of the chrominance subcarrier frequency and necessary for demodulation purposes.

The amplified burst signal appearing at terminal 111 is then applied to a narrow band crystal 128 having a resonant frequency about the chrominance subcarrier (3.58 MHz.). The exact resonant frequency is further determined by a variable capacitor 129, coupled in series with the crystal 128, between the terminal 111 and the terminal 107 or the input terminal to the chroma oscillator circuit. Briefly, the chroma oscillator circuit comprises an amplifier stage including transistors 126, 127 and 128 and a limiter stage comprising transistor 125.

Transistors 127 and 128 are arranged in a beta multiplication circuit sharing a common collector connection and having the base electrode of transistor 128 driven from the emitter electrode of transistor 127. The emitter electrode of transistor 127 is further referenced to ground through a resistor 135. A common collector load, for transistors 127 and 128, is provided by resistor 136 coupled between the common collector point and the $+V_{cc}$ supply terminal. The beta multiplication circuit, thusly formed, permits low base currents to flow through the base to emitter junction of transistor 127, while obtaining relatively high amplification for transistors 127 and 128. The low base current operation, including a DC feedback path, provides DC stabilization with temperature variations for the oscillator configuration as well as for voltage changes which are normally beta sensitive. This assures that the DC potential at terminals 108 and 109 is relatively beta insensitive. The DC feedback amplifier, for assuring overall DC oscillator stability, includes transistor 126 having the collector electrode coupled to the $+V_{cc}$ supply via resistor 137. The emitter electrode of transistor 126 is referenced to ground through the series load comprising resistors 138, 139 and 140. DC feedback for the oscillator is provided by resistor 141 coupled between he junction of resistors 138 and 139 and the base electrode of transistor 127. The junction between the base electrode of transistor 127 and resistor 141 is coupled to terminal 107 (input terminal of the oscillator), to complete the AC feedback path for the oscillator as described above.

The amplifier configuration with DC feedback thus described, further assures a low input impedance for the oscillator circuit as seen looking into the base electrode of transistor 127. The low impedance, due to the magnitude of the AC feedback ratio, to be described, permits the resonant circuit comprising the crystal 128 and capacitor 129 to operate relatively frequency independent of the characteristics of the transistors utilized therein.

Transistor 126 has a collector electrode returned to $+V_{cc}$ via a current-limiting resistor 137. The emitter electrode of transistor 126 is further coupled to the base electrode of a transistor 125 used as a limiter for the oscillator circuit, and as part of the AC feedback path as will be further explained. The collector electrode of the limiter transistor 125 is coupled to terminal 111 via the circuit protecting resistor 122. The emitter electrode of transistor 125 is coupled to terminal 109 on the integrated circuit substrate. An external adjustable RC network used both for ACC and killer threshold adjustment is coupled between terminal 109 and a point of reference potential and comprises variable resistor 146 and variable capacitor 145 operating in conjunction with transistor 125. The emitter electrode of transistor 125 is also coupled to the base electrode of transistor 147 used in a color killer circuit.

Transistor 147 is arranged in an emitter follower configuration and has the collector electrode directly connected to the $V_{cc}$ supply, and the emitter electrode returned to reference potential through resistor 148.

The emitter electrode of transistor 147 is further coupled to the base electrode of a follower transistor 149 through a resistor 150. The junction between the base electrode of transistor 149 and resistor 150 is coupled to substrate terminal 104. A killer time constant capacitor 151 is externally connected between terminal 104 and the point of reference potential.

The emitter electrode of transistor 149 is coupled to a point of reference potential via resistor 152 and is coupled to the base electrode of a DC amplifier transistor 47 via resistor 153.

Transistor 47 forms part of a color killer switch circuit with transistor 90, having the base electrode coupled to the collector electrode of transistor 47. The respective emitter electrodes of transistors 47 and 90 are returned to the point of reference potential. The collector electrode of transistor 90 is returned to terminal 113 via a collector load resistor 89 for disabling the chroma amplifier 25 during a monochrome transmission.

The collector electrode of transistor 42 is returned to a biasing reference diode string via resistor 46 associated with the chroma amplifier 30. For a more detailed explanation of the specific connections, and of the chroma amplifier circuitry mentioned above, see the above-mentioned application entitled "Automatic Chroma Control Circuits" assigned to the same assignee and filed concurrently herewith.

Referring back to the emitter path of transistor 126, used in color oscillator configuration, a control signal for the ACC peak detector circuit 40 is provided for by coupling the junction between resistors 139 and 140 to the input thereof. An RC network 50 is used for ACC time constant control and is coupled externally to the substrate via terminal 102, which terminal is further coupled to the peak detector 40.

Full operating details and component values for the ACC circuit operation are provided in the above note copending application.

The operation of the chroma oscillator circuit including the color killer circuit briefly described above, will now be explained in greater detail.

During the horizontal retrace interval the keying pulse, applied to terminal 110, activates the burst amplifier 27 via the keyed circuit 27. During a color transmission the burst frequency signal as bandwidth limited by inductor 98, resistor 99 and capacitor 120 appears at terminal 111. The aforementioned tank circuit further serves to remove the horizontal retrace pulse frequencies from affecting the burst output. The amplified burst is coupled to the oscillator input terminal 107 via the crystal filter comprising crystal 128 and tuning capacitor 129.

The oscillator is an injection-locked type and thereby provides at a signal output terminal (terminal 108) a signal which is synchronized to the amplified burst signal appearing at terminal 111. The series combination of inductor 130 and capacitor 131 is connected between terminal 107 and the $+V_{cc}$ supply and is selected to compensate for any stray capacitance associated with the crystal holder or plug adapter, including the case capacitance of crystal 128.

The selection of the above noted tank circuit comprising inductor 98, capacitor 120 and resistor 99 affords a resonant frequency response about 3 megacycles which is slightly below the chrominance subcarrier frequency. The damping resistor 99 provides a relatively broad bandwidth about this center frequency to assure that the tank component provide the required bandwidth and phase information necessary to lock the oscillator and assure that the resonant frequency is crystal determined. Basically, the oscillator circuit consists of an amplifier stage, a limiting stage and a filter network.

The amplifier stage is formed by transistors 126, 127 and 128 and the resistors 136, 138, 139, 140 and 141. The amplifier is DC stabilized by means of a feedback resistor 141 coupled between the emitter electrode of transistor 126 and the base electrode of transistor 127. The DC feedback afforded permits the amplifier to operate relatively insensitive to supply and temperature variations. Essentially, the input terminal 107 to the oscillator, as coupled to the base electrode of transistor 127, is DC stabilized by the negative feedback provided by the coupling of the collector electrode of transistor 128 to the base electrode of transistor 126. The DC quiescent voltage at the emitter of transistor 126 is fed back to the base electrode of the input transistor 127 via the resistor 141.

The limiter amplifier stage of the oscillator includes transistors 125, the emitter load of the external resistor 146 and capacitor 145 coupled to terminal 109, and the collector resistor 142 coupled to terminal 111. At the operating frequency of the oscillator determined primarily by the crystal 128, capacitor 145 serves to bypass the emitter resistor 146. Transistor 125 functions as an ordinary common emitter amplifier as driven from transistor 126 for small signal operation. There is approximately a 360° phase shift provided between terminal 107 and terminal 111 which are then coupled together via the crystal filter network, to cause oscillations to start a frequency determined primarily by the crystal. As the oscillator signal amplitude increases such increases serve to change the capacitor 145 and the DC potential at the emitter electrode of the transistor 125 increases. This action tends to back or reverse bias transistor 125. As the emitter voltage increases the gain of the transistor 125 decreases, due to the $g_m$ variations with collector current. The limiter action provided by transistor 125 causes the oscillator to reach a predetermined amplitude, as will be further described, in conjunction with FIG. 3.

The level at which limiting takes place, in turn, specifies the peak-to-peak voltage output of the oscillator signal as controlled by the setting of the variable resistor 146. Resistor 146 essentially determines the amount of DC current that can flow through transistor 125, as the magnitude of this resistor is greater than the effective DC collector load impedance. Capacitor 145 is selected so that the time constant of resistor 146 and capacitor 145 is of the order of magnitude of one to several cycles of the oscillator signal. In the ACC control system, as described in detail in the aforementioned copending application, resistor 146 therefore determines a quiescent operating level for the ACC circuit and is referred to as an ACC threshold control. Capacitor 145 serves, in conjunction with the base to emitter junction of transistor 125, as an average detector circuit which provides a voltage at the emitter electrode directly proportional to the average amplitude of the oscillator signal. Because of the time constant selected, according to the magnitudes of resistor 146 and capacitor 145, the DC potential at the emitter varies as a function of the average amplitude of the oscillator. Since the detector formed, in part, by the base to emitter junction of transistor 125 is of an average type, the voltage across the capacitor 145 at the end of a horizontal line will be be substantially independent of noise peaks as effecting the peak-to-peak amplitude of the oscillator. This is so as noise components which can and do couple through the crystal filter can effect the amplitude of the oscillator during burst injection. However, because of the random nature and the long term zero energy power distribution of noise, the detector effectively serves to ignore such variations. This is desirable as the color killer detector, preferably should be noise insensitive. If color killing were noise dependent, the operation of the color killer circuit would serve to enable the chroma channel during high noise conditions which may occur during a monochrome transmission.

An important characteristic of an injection-locked oscillator is the ability to respond properly to the burst signal. The locking capability of the oscillator both as to the phase and frequency is a function of the bandwidth of the crystal 128 and of the resonant tank circuit coupled to terminal 111. Basically, the magnitude of the amplitude of the injected burst as compared to the magnitude of the amplitude of the quiescent oscillator signal, as affected by such resonant circuits, determines the locking ability.

Generally, the larger the amplitude of the applied burst the better the tendency for locking. In the oscillator circuit described, the quiescent oscillator signal at the emitter electrode of transistor 125 is set to a first level (1.5 volts peak to peak) by adjusting resistor 146 which sets a limit on the amplitude of quiescent oscillations. Upon application to transistor 127 of a 3-volt peak-to-peak burst signal applied to the crystal 128 at terminal 111 the oscillator signal increases at the emitter electrode of transistor 126 to approximately 4 volts peak to peak. The magnitude of the change in amplitude (i.e. almost a three times change) enables the color killing circuitry to operate reliably while further permitting the amplifying transistors 126, 127 and 128 to function within their linear dynamic range.

Basically, the amplitude of the oscillator as appearing at terminal 108 during the presence of burst is a function of burst. The oscillator signal voltage appearing at the emitter electrode of transistor 126 is therefore representative of the peak amplitude of the oscillator signal as determined by the prefiltered signals applied through the narrow-band crystal filter to the input terminal 107 of the oscillator. Accordingly, the oscillator can exhibit a change in amplitude of 3 to 1 times for the presence and absence of burst.

Noise having frequency components within the band-pass of the crystal filter can also propagate through the crystal 128, if present, during the burst interval. Therefore noise may effect the amplitude of the oscillator depending upon the frequency and phase, in a similar manner as the oscillator is effected by the burst. This characteristic of the oscillator is used to advantage in the ACC control circuitry as described in detail in the above-noted copending application. Killer detection is provided by the transistor 125, in conjunction with resistor 146 and capacitor 145 which operates as an average detector. Operation of the killer circuit is as follows.

As previously mentioned, there can be as much as a 3 to 1 increase in the amplitude of the oscillator during a color transmission as compared to a monochrome transmission. This amplitude may vary on a line-to-line basis as due to noise pulses or otherwise. The information stored in the crystal during the burst interval effects the amplitude and phase of the oscillator signal for the duration of the horizontal line. The average detector provided by the rectifying action of the base to emitter junction of transistor 125, and the time constant afforded by resistor 146 and capacitor 145, assures that peak amplitude fluctuations, which are due to noise and thus are random in nature, do not effect the voltage across the capacitor to a substantial degree during the presence of burst. This, therefore, provides noise immune color killer operation. Due to the overall large amplitude of the oscillator for a color transmission as compared to a monochrome transmission there is a larger average DC voltage produced across capacitor 145 during a color transmission. This increased voltage serves to forward bias transistor 147. Transistor 147 exhibits an increased emitter voltage which in turn forward biases transistor 149 via resistor 150. Further filtering of the chroma subcarrier frequency is provided by resistor 150 and capacitor 151. Capacitor 151 provides a large time constant to integrate out undesirable fluctuations of DC at terminal 109, and also serves to afford noise immunity. The potential at the emitter electrode during the forward baising of transistor 149 is therefore relatively high and transistor 47 is caused to conduct. The conduction of transistor 47 serves to cut off transistor 90 during the presence of burst. If, as during a monochrome transmission, there is a loss of burst the voltage across capacitor 151 decays and becomes no longer sufficient to turn on transistor 47 via resistor 153. In this case transistor 90 saturates. The action serves as a bypass, via the collector to emitter path of transistor 90, for biasing current which would normally flow into terminal 113 to bias chroma amplifier 25. The bias current bypass serves to disable chroma amplifier 25 during the monochrome transmission.

In summation, the color killer circuit as described is relatively noise immune as the average detector comprising the base to emitter junction of transistor 125, resistor 146 and capacitor 145 averages out any random fluctuations of the oscillator amplitude due to noise, as further bandwidth limited by the crystal filter. The resultant noise immunity afforded by the color killer circuit operation assures reliable killer operation.

The advantage of this particular oscillator configuration in regard to conservation of terminals on the integrated substrate will now be described. The oscillator circuit has provided therein a single output feedback terminal 111 which is shared in common by the burst amplifier state 27. The selectivity for the burst signal is afforded by the tank circuit, comprising in part, inductor 98 and capacitor 120. The tank circuit serves, as externally connected, to provide burst selectivity, while further providing the requisite frequency and phase response necessary to assure proper locking and frequency control for the oscillator circuit. The external tank circuit is then coupled through the external crystal filter network to the input terminal 107 of the oscillator, thus completing the AC feedback loop. Accordingly, two terminals on the integrated circuit substrate permits the user to provide all connections of all external components for burst selectivity, oscillator selectivity and burst injection to the oscillator; while further enabling proper phase and frequency response characteristics for reliable locking of the oscillator circuit. Terminal 107 also has coupled thereto a capacitor 132 which serves, in combination, with the input transistor amplifier circuits to assure that the oscillator configuration will not exhibit spurious high frequency oscillations tending to disturb normal operation.

An output terminal 108 is also provided for coupling the burst synchronized oscillator signal, as described above, to color demodulator circuits not shown. The output is taken from the relatively low impedance driving source as seen looking into the emitter electrode of transistor 126. This therefore provides an isolated terminal where the coupling thereto of external circuitry does not effect the amplitude or stability of the oscillator circuit, to any appreciable extent. A fourth terminal 109 associated with the oscillator circuit has coupled thereto a parallel combination of variable resistor 146, and variable capacitor 145.

As indicated previously, the variable resistor 146 serves as an ACC threshold adjust at the common terminal 109, as the setting thereof effects the quiescent peak-to-peak amplitude of the oscillator signal. The capacitor 145 selected with resistor 146 functions to provide a voltage thereacross representative of the average amplitude of the oscillator signal during the duration of a horizontal line. The controllable variation of the capacitive magnitude, as effecting the time constant, serves to control the charge and discharge time, of the detector and hence the average voltage which will be supplied across capacitor 145 at the end of a horizontal line. Accordingly, capacitor 145, as also coupled to terminal 109, provides a killer threshold adjustment. Both controls, generically, as an ACC control and a killer threshold control, are provided for in many conventional receivers by other techniques, which may require at least two independent and separate circuits. This inherently requires the addition of a multiplicity of extra terminals, as compared to the configuration shown.

Figure 3:
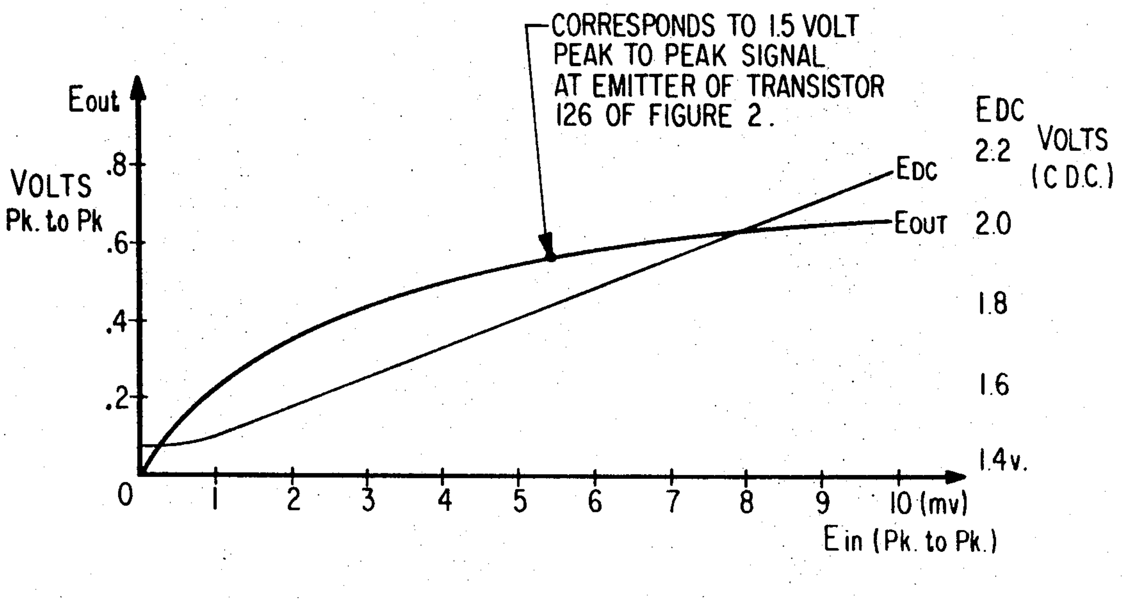
FIG. 3 is a graph useful in explaining the operation of the circuitry shown in FIG. 2.

Referring to FIG. 3 there is shown a graph indicating the typical limiting characteristics afforded by resistor 146 and the voltage developed across capacitor 145 in relationship to the quiescent amplitude of the oscillator output signal. In order to obtain such a characteristic graph as shown in FIG. 3, the AC feedback path for the oscillator is opened, by removing the external wire or lead coupled to terminal 107. The curve labeled $E_{out}$ represents the RF peak-to-peak voltage appearing across capacitor 132 at the crystal frequency. The curve labeled $E_{dc}$ represents the DC voltage at the emitter electrode of transistor 125. The abscissa, labeled $E_{in}$ (peak to peak) is the voltage (in millivolts) applied by means of a signal generator, coupled to terminal 107. The ordinates specify the magnitude of the output voltage as $E_{out}$ peak to peak, and $E_{dc}$ in DC volts. As can be seen from the graph the DC voltage at the emitter of transistor 125 stays relatively constant for input signal amplitudes from 0 to slightly above 1 millivolt. As the input signal frequency (3.53 MHz.) amplitude increases the DC voltage increases approximately linearly and reaches a value of about approximately 2.2 volts for 10 millivolts input. As the input voltage applied to terminal 107 increases the voltage across capacitor 132, labeled $E_{out}$, also increases rapidly in the beginning, but begins to limit at an input voltage of approximately 5 millivolts peak to peak. Accordingly, as can be seen from FIG. 3, the amplitude of the output voltage increases from 0 to approximately 0.6 volts for an input voltage change from approximately 0 to 6 millivolts peak to peak.

From 6 to 10 millivolts there is only approximately a 0.13 volts peak-to-peak change for this particular range. This clearly shows the limiting action of the configuration described in FIG. 2. With reference to FIG. 3 the oscillator is quiescently set up, such that effective output voltage which corresponds to the open circuit voltage across capacitor 132, is selected at about 0.6 volts peak to peak on the $E_{out}$ curve. This setting corresponds to a DC voltage at the emitter of transistor 125 of approximately 1.9 volts. This setting under closed loop conditions provides a signal voltage, described above, at the emitter electrode of transistor 126 of approximately 1.5 volts peak to peak. For the injection of a burst signal through the crystal filter, under closed loop conditions, of 3 volts peak to peak at terminal 111, the effective amplitude at the emitter electrode of transistor 126 increases to approximately 4 volts peak to peak.

The inherent AC and DC feedback provided for by the oscillator circuit assures that the quiescent output of 1½ volts at the emitter of transistor 126, as seen from FIG. 3, remains relatively constant from chip to chip. Such stability for oscillators of the above described unique configurations, exists irrespective of normal beta variations that may exist from chip to chip in the transistors utilized in such configurations as transistors 125, 126, 127 and 128.

The ratios of the various resistors as resistors 138, 139, 140 and 141 as deposited are determinative of the amount of feedback provided and hence the feedback scheme utilized is a function of resistor ratio rather than absolute values. This therefore accurately determines DC feedback magnitude and as such is well within the component tolerances afforded by monolithic integrated circuit technology.

By way of example only, a table of values is presented below for various on-chip components of the circuitry of FIG. 2 and the various off-chip components of the cooperating circuitry illustrated in that figure.

TABLE A

ON-CHIP COMPONENTS

| | | |
|---|---|---|
| Resistor | 46 | 5,000 ohms |
| Resistor | 89 | 4,000 ohms |
| | 135 | 5,000 ohms |
| | 136 | 5,000 ohms |
| | 137 | 400 ohms |
| | 138 | 820 ohms |
| | 139 | 270 ohms |
| | 140 | 1,000 ohms |
| | 141 | 820 ohms |
| | 142 | 500 ohms |
| | 148 | 5,000 ohms |
| | 150 | 5,000 ohms |
| | 152 | 1,300 ohms |
| | 153 | 1,000 ohms |

TABLE B

OFF-CHIP COMPONENTS VALUES

| | | |
|---|---|---|
| Capacitor | 85 | 0.01 microfarads |
| | 129 | 5–20 micromicrofarads (variable) |
| | 131 | 8.2 micromicrofarads |
| | 132 | 30 micromicrofarads |
| | 145 | 5–15 micromicrofarads (variable) |
| | 151 | 100 microfarads |
| Resistor | 86 | 2,000 ohms |
| | 87 | 0–10 K ohms (variable) |
| | 99 | 1,000 ohms |
| | 146 | 0–40 Kilohms (variable) |
| Inductor | 34 | Selected with C35 to resonate at 3.08 MHz (approximately) |
| | 73 | Selected with C73 to resonate at 4.08 MHz (approximately) |
| | 98 | Selected with C120 to resonate at 3.0 MHz (approximately) |
| | 130 | Mutually coupled with inductor 98 |
| Crystal | 128 | 3.58 MHz unit (Electrodynamics Corp. type) |

A Q-damping resistor of 10,000 ohms may be placed in shunt with C34 and L35; while a 2,400 ohm resistor may be placed across C73 and L72.

What is claimed is:

1. An oscillator circuit for providing an output signal synchronized in phase and frequency to the phase and frequency of a reference signal applied thereto, said reference signal accompanied by spurious frequency signals including noise, comprising, a. a first amplifier circuit having input and output terminals, b. a limiter amplifier stage having an input, output and a common terminal, said input terminal thereof coupled to said output terminal of said amplifier, c. a filter network, including a crystal, having a frequency response characteristic centered relatively about said frequency of said reference signal, coupled between said output terminal of said limiter amplifier and said input terminal of said first amplifier for providing AC feedback for said amplifiers of a sufficient magnitude to sustain oscillations at a frequency substantially equal to said reference signal frequency, d. means coupled to said filter network for applying said reference signal thereto, to cause said reference signal and any of said accompanying frequency signals, including noise, within said frequency characteristic of said filter means as coupled to said amplifier input terminal to synchronize said oscillations to said reference signal, the amplitude of said oscillations in said oscillator varying as a function of the magnitude of the amplifier of said reference signal and spurious frequency signals including noise, propagated through said filter means, e. means coupled to said common terminal of said limiter stage for adjusting the amplitude of said oscillations and including means for providing a DC potential representative of the average amplitude of said oscillations relatively independent of any variations of said amplitude due to noise components.

2. The oscillator circuit according to claim 1, wherein said limiter amplifier stage comprises, a. a transistor having a base, collector and an emitter electrode, said base electrode coupled to said output terminal of said first amplifier, said collector electrode coupled to said filter network.

b. a resistor and a capacitor network connected in shunt and having a time constant adjustable from one to several cycles of said reference signal frequency, said resistor and capacitor connected between said emitter electrode of said transistor and a point of reference potential, to cause said emitter to base junction with said network to operate as an average detector at said frequency of oscillations.

3. An oscillator circuit for providing an output signal synchronized in phase and frequency to the phase and frequency of an oscillatory burst signal applied thereto, comprising, a. a DC coupled amplifier circuit having input and output terminals, including means coupled between said input and output terminals for providing DC feedback, b. a limiter amplifier stage having an input terminal coupled to said output terminal of said amplifier and a separate output terminal, c. A resonant circuit, having a frequency response characteristic centered about a frequency lower than said frequency of said burst signal, said resonant circuit coupled to said output terminal of said limiter amplifier, d. filter means, including a crystal, having a frequency response characteristic centered relatively about said frequency of said burst signal, coupled between said output terminal of said limiter amplifier and said input terminal of said DC coupled amplifier for providing AC feedback to said DC coupled amplifier and limiter amplifier of a sufficient magnitude to sustain oscillations at frequency close to said burst signal frequency, e. means coupled to said resonant circuit for applying said oscillatory burst signal thereto, to cause said burst signal and any accompanying frequency signals including noise, within said frequency characteristic of said filter means to propagate through said filter means coupled to said amplifier input terminal, for synchronizing said oscillations to said burst signal, the amplitude of said oscillations in said oscillator varying as a function of the magnitude of the amplitude of said burst and any accompanying frequency signals including noise, propagate through said filter means, f. means coupled to said limiter stage for determining the maximum amplitude of said oscillations when said oscillator is so synchronized and for providing a DC potential representative of the average amplitude of said oscillations relatively independent of any variations of said amplitude due to noise components.

4. An oscillator circuit for providing an output signal synchronized in phase and frequency to the phase and frequency of a reference signal applied thereto, comprising, a. a first transistor having a base, collector and emitter electrode, arranged in a common emitter amplifier configuration, b. a second transistor having a base, collector and emitter electrodes, arranged in a common collector amplifier configuration and having the base electrode thereof coupled to the collector electrode of said first transistor, c. means coupling the emitter electrode of said second transistor to the base electrode of said first transistor for providing DC feedback thereto, d. a third transistor having a base, collector and emitter electrodes, and having the base electrode thereof coupled to the emitter electrode of said second transistor, e. a narrow band filter network including a crystal, having center frequency close to said reference frequency, coupled between the collector electrode of said third transistor and the base electrode of said first transistor for providing AC feedback of a proper phase and of a frequency, determined by said crystal, for sustaining oscillations substantially close to said reference frequency, X f. first means providing a current path coupled to the emitter electrode of said third transistor for determining the amplitude of said oscillations, g. second means coupled in shunt with said first means and a point of reference potential and operative with the base to emitter junction of said third transistor to provide a DC control voltage thereacross proportional to the average value of said amplitude of oscillations.

5. The oscillator according to claim 4 wherein, said first and second means coupled to the emitter electrode of said third transistor comprises, a. a variable resistor in shunt with a variable capacitor, selected to provide a time constant adjustable from one to several cycles of said reference frequency, coupled between said emitter electrode and a point of reference potential, said resistor thereby determining the maximum DC current that can flow in said transistor and therefore the quiescent magnitude of said oscillations, said variable capacitor serving to charge through the base to emitter junction of said transistor to a level determined by said resistor magnitude and proportional to the average value of said magnitude of said oscillations.

6. The oscillator circuit according to claim 4 wherein said means coupling the emitter electrode of said second transistor to the base electrode of said first transistor comprises, a. a fourth transistor, having a collector electrode thereof directly connected to the collector electrode of said first transistor, and having an emitter electrode thereof coupled to the base electrode of said first transistor, and having a base electrode thereof coupled to the emitter electrode of said second transistor, said first and fourth transistors forming a beta multiplication amplifier for enabling low DC feedback signal levels to propagate between said emitter electrode of said second transistor and the base electrode of said fourth transistor.

7. An oscillator circuit for providing an output signal synchronized in phase and frequency to the phase and frequency of an input reference signal applied thereto, comprising, a. a first, second and third terminals, b. first and second transistors, having base, collector and emitter electrodes, said first transistor arranged in a common emitter configuration and having the collector electrode thereof coupled to the base electrode of said second transistor, said second transistor, arranged in a common collector configuration and having the emitter electrode thereof coupled to the base electrode of said first transistor and further coupled to said first terminal, c. a third transistor having a collector electrode coupled to said second terminal, and the base electrode thereof coupled to said emitter electrode of said second transistor and the emitter electrode thereof coupled to said third terminal, d. a filter network coupled between said first and second terminals for providing AC feedback to said transistor for sustaining oscillations at a frequency determined by said filter network and substantially close to said reference frequency, e. a shunt network, including a variable resistor and capacitor coupled between said third terminal and a point of reference potential, said resistor determining the amplitude of said oscillations while having a time constant with said capacitor selected in accordance with said frequency of oscillations to operate said base to emitter junction of said third transistor as an average detector whereby a voltage proportional to the average amplitude of said oscillations is developed across said capacitor, f. frequency selective means coupled to said second terminal for applying said reference signal to said filter network to synchronize said oscillations in frequency and phase to said reference signal, by causing said filter network to propagate to said first terminal signal frequencies within the band-pass of said filter network, said means having a sufficient impedance at said reference frequency relative to that impedance of said filter network to substantially affect said amplitude of oscillations in accordance with the setting of said variable resistor.

8. In a color television receiver adapted to receive and process a color television signal including chrominance information components and color synchronizing bursts having a prescribed phase and frequency, in combination therewith, an oscillator circuit comprising, a. a first amplifier having input and output terminals, b. a limiter amplifier stage having an input, output and a common terminal said input terminal thereof coupled to said output terminal of said first amplifier, c. a filter network, including a crystal, having a frequency response characteristic centered relatively about said frequency of said synchronizing bursts, coupled between said output terminal of said limiter amplifier and said input terminal of said first amplifier for providing AC feedback for said amplifiers of a sufficient magnitude to sustain oscillations at a frequency substantially equal to said burst signal frequency, d. means coupled to said filter network for applying said burst signal thereto, to cause said burst signal and any accompanying frequency signals, including noise, within said frequency characteristic of said filter means coupled to said amplifier input terminal for synchronizing said oscillations to said burst signal, the amplitude of said oscillations in said oscillator varying as a function of the magnitude of the amplitude of said burst signal and any accompanying frequency signals including noise, propagated through said filter means, e. means coupled to said common terminal of said limiter stage for adjusting the amplitude of said oscillations and including means for providing a DC potential representative of the average amplitude of said oscillations relatively independent of any variations of said amplitude due to noise components.

9. The chroma oscillator circuit according to claim 8 further comprising, a. a DC amplifier having an input terminal coupled to said common terminal of said limiter amplifier for providing a first DC potential at an output terminal thereof according to the magnitude of said average amplitude of oscillations during the absence of said burst signal and a second DC level during the presence of said burst signal, b. means coupling said DC amplifier to said chroma information processor for disabling said chroma information processor for said first DC potential and for enabling the same for said second DC level.

10. The chroma oscillator circuit according to claim 8 further comprising, a. a peak detector circuit coupled to the output terminal of said first amplifier and responsive to the magnitude of said oscillations for providing at an output terminal thereof a control voltage proportional to the peak value of said oscillations, b. means coupling said output terminal of said peak detector to said chroma information processor for varying the gain thereof in accordance with the magnitude of said control voltage.

* * * * *

UNITED STATES PATENT OFFICE
CERTIFICATE OF CORRECTION

Patent No. 3,617,622 Dated November 2, 1971

Inventor(s) Leopold Albert Harwood

It is certified that error appears in the above-identified patent and that said Letters Patent are hereby corrected as shown below:

Column 1, line 48, that portion reading "considerations in" should read -- considerations is --. Column 4, line 64, that portion reading "$V_{cc}$" should read -- $+V_{cc}$ --. Column 5, line 14, that portion reading "above-mentioned application" should read -- above-mentioned copending application --. Column 5, line 32, that portion reading "keyed circuit 27" should read -- keyed circuit 26 --. Column 6, line 10, that portion reading "change the capacitor" should read -- charge the capacitor --. Column 10, line 24, that portion reading "said amplifier" should read -- said first amplifier --. Column 12, line 19, that portion reading "a first" should read -- first --.

Signed and sealed this 9th day of May 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
☆ U.S. GOVERNMENT PRINTING OFFICE : 1969 O—366-334